UNITED STATES PATENT OFFICE.

BERTRAND S. SUMMERS, OF PORT HURON, MICHIGAN.

LINOLEUM PRODUCT AND PROCESS OF MAKING SAME.

965,344.  Specification of Letters Patent.  Patented July 26, 1910.

No Drawing. Application filed September 11, 1905. Serial No. 278,029.

*To all whom it may concern:*

Be it known that I, BERTRAND S. SUMMERS, a citizen of the United States, residing at Port Huron, in the county of St. Clair and State of Michigan, have invented a certain new Linoleum Product and Process of Making the Same, of which the following is a description.

The ordinary linoleum of commerce is mainly composed of a mixture of an oxidized oil cement with ground cork. Cork is comparatively expensive and does not grow in this country. Many efforts have been made to find a suitable and less expensive substitute for it in the manufacture of linoleum, but without success, prior to my invention, so far as I am aware. Among the substances with which I and others have experimented is the straw of the flax plant, grinding up the entire plant, with the exception of the seed, and mixing it with the oil cement, after the manner of cork; but none of these experiments resulted in the production of a satisfactory product for the manufacture of linoleum.

I have discovered, by further experiments, that a much improved product for the purpose mentioned may be obtained if both the seed and fiber of the plant be first removed, and that the product is still further and greatly improved if the woody portion of the straw, which is to be employed as a substitute for cork, be roasted before being mixed with the oil cement. This woody portion of the straw, remaining after the removal of the seed and fiber, is ground to suitable fineness, (say from 20 to 60 mesh) and then roasted in any suitable apparatus which will roast it without burning, after which it is mixed with the oil cement in the same manner as ground cork is mixed with such cement under the present practice. I have further discovered that the addition of a small amount of resin materially improves the product, and in practice I have found that one part of resin to nineteen parts of the ground flax straw, mixed together before the roasting of the latter, produces satisfactory results. This roasting not only dries out this woody portion of the straw, but modifies its character and renders it very much less gummy and sticky, so that when mixed with cement, as hereinbefore described, the mixture is even less sticky than the cork mixture commonly used and will not adhere to the rolls of the machine used in forming the linoleum, as it would tend to do if the material were not roasted. It also causes an expansion of the volume of the material, which is important in that a considerably greater amount of linoleum can be manufactured from a given quantity of the woody part of flax straw by roasting it than without. The resin tends to reduce the amount of cement necessary to produce a good linoleum, and a linoleum which compares favorably with cork linoleum may be produced by using the roasted ground flax straw and resin in the proportions before mentioned, mixed with oil cement in the same proportions by volume as would be used in making a cork linoleum.

The mere removal of the seed and fiber of the flax plant leaves not only the woody portion or "shive," but also a considerable amount of "chaff." The latter may be removed from the shive or woody portion of the straw, and the latter alone employed, and a somewhat better quality of product obtained than if the chaff be left with the shive. But I have found by experiments and practice that a fairly satisfactory quality of product may be obtained when both are used, and as the chaff forms a considerable portion of the straw remaining after the removal of the fiber commercial considerations may in some cases render its employment desirable, even at the expense of a slight impairment of the quality of the resulting product. The essential feature of my invention is the employment of the woody portion of the flax straw (either with or without the chaff,) and particularly when roasted before being mixed with the oil cement.

Any suitable apparatus for grinding the straw and for roasting the ground product, as well as for mixing the latter with the oil cement, may be employed, and it is not considered necessary to a full explanation of my invention to here illustrate and describe any particular form of such apparatus. The roasting may be done before the grinding, instead of after, if desired.

Having thus fully described my invention, I claim:

1. The herein described product, consisting of the woody portion of flax straw ground to suitable fineness and roasted and mixed with an oil cement; substantially as described.

2. The herein described process of producing a suitable product for the manufacture of linoleum, consisting in grinding the woody portion of flax straw to a suitable fineness, roasting it, and then mixing it with a suitable oil cement; substantially as described.

3. The herein described process of producing a suitable product for the manufacture of linoleum, consisting in grinding the woody portion of flax straw to a suitable fineness, adding a relatively small percentage of resin, roasting the mixture, and then mixing it with a suitable oil cement; substantially as described.

4. The herein described product, consisting of the woody portion of flax straw ground to suitable fineness and roasted, and then mixed with an oil cement; substantially as described.

5. The herein described product, consisting of the woody portion of flax straw ground to suitable fineness, mixed with a relatively small percentage of resin, roasted, and then mixed with an oil cement; substantially as described.

6. The herein described product consisting of the finely comminuted woody portion of flax straw roasted and mixed with suitable cement.

BERTRAND S. SUMMERS.

Witnesses:
 FLORENCE SUMMERS,
 DAVID MACTAGGART.